(12) United States Patent
Suzuki et al.

(10) Patent No.: US 9,171,655 B2
(45) Date of Patent: Oct. 27, 2015

(54) SOLID ELECTROLYTE FILM, AND METHOD FOR PRODUCING SAME

(75) Inventors: Katsutoshi Suzuki, Hino (JP); Yoshihiko Obara, Matsusaka (JP); Toru Tanaka, Fujimino (JP); Haruhiko Komoriya, Saitama (JP)

(73) Assignee: Central Glass Company, Limited, Ube-shi (JP)

( * ) Notice: Subject to any disclaimer, the term of this patent is extended or adjusted under 35 U.S.C. 154(b) by 354 days.

(21) Appl. No.: 13/574,167

(22) PCT Filed: Feb. 15, 2011

(86) PCT No.: PCT/JP2011/053091
§ 371 (c)(1),
(2), (4) Date: Jul. 19, 2012

(87) PCT Pub. No.: WO2011/102327
PCT Pub. Date: Aug. 25, 2011

(65) Prior Publication Data
US 2012/0301811 A1    Nov. 29, 2012

(30) Foreign Application Priority Data

Feb. 16, 2010 (JP) .................................. 2010-030779
Feb. 9, 2011 (JP) .................................. 2011-025965

(51) Int. Cl.
H01B 1/12       (2006.01)
H01M 8/04       (2006.01)
H01M 8/10       (2006.01)

(52) U.S. Cl.
CPC ........... *H01B 1/122* (2013.01); *H01M 8/04261* (2013.01); *H01M 8/103* (2013.01); *H01M 8/1011* (2013.01); *H01M 8/1023* (2013.01); *Y02E 60/523* (2013.01)

(58) Field of Classification Search
CPC ................................................ H01M 8/04261
USPC ........................................................ 526/243
See application file for complete search history.

(56) References Cited

U.S. PATENT DOCUMENTS

| | | | | |
|---|---|---|---|---|
| 3,704,311 A | * | 11/1972 | Koshar | .......................... 560/222 |
| 5,696,224 A | * | 12/1997 | Benrabah et al. | ............. 528/491 |
| 6,956,083 B2 | | 10/2005 | Kerr et al. | |
| 7,544,445 B2 | | 6/2009 | Kinouchi et al. | |
| 7,781,085 B2 | | 8/2010 | Sugiyama | |
| 7,803,846 B2 | | 9/2010 | Yoshida et al. | |
| 8,580,486 B2 | * | 11/2013 | Nagamori et al. | ......... 430/270.1 |
| 8,822,588 B2 | * | 9/2014 | Terui et al. | .................... 524/544 |
| 2005/0069780 A1 | | 3/2005 | Kinouchi et al. | |
| 2005/0221193 A1 | | 10/2005 | Kinouchi et al. | |
| 2006/0286424 A1 | | 12/2006 | Sugiyama | |
| 2008/0038614 A1 | | 2/2008 | Nakazawa et al. | |

FOREIGN PATENT DOCUMENTS

| | | | |
|---|---|---|---|
| EP | 2 009 723 A1 | | 12/2008 |
| JP | 11260407 A | * | 9/1999 |
| JP | 2003-331647 A | | 11/2003 |
| JP | 2005-162623 A | | 6/2005 |
| JP | 2006-32181 A | | 2/2006 |
| JP | 2006-179301 A | | 7/2006 |
| JP | 2008-112712 A | | 5/2008 |
| WO | WO 04/001771 A1 | | 12/2003 |

OTHER PUBLICATIONS

Machine translation of JP 11-260407 A, Oct. 2014.*
International Search Report with English translation dated Apr. 26, 2011 (five (5) pages).
European Search Report dated Jul. 2, 2013 (four (4) pages).
Form PCT/ISA/237 (four (4) pages) dated Apr. 26, 2011 with English translation (five (5) pages).

* cited by examiner

*Primary Examiner* — Nicole M Buie-Hatcher
(74) *Attorney, Agent, or Firm* — Crowell & Moring LLP

(57) ABSTRACT

A solid electrolyte film including a resin having a repeating unit containing a bis(perfluoroalkanesulfonyl)methide moiety. This solid electrolyte film combines high proton conductivity with low methanol permeability for prevention of methanol crossover and can suitably be used for a direct methanol fuel cell.

3 Claims, No Drawings

SOLID ELECTROLYTE FILM, AND METHOD FOR PRODUCING SAME

TECHNICAL FIELD

The present invention relates to a solid electrolyte film for a polymer electrolyte fuel cell and a method for producing the solid electrolyte film. More particularly, the present invention relates to a solid electrolyte film for a direct methanol fuel cell and a method for producing the solid electrolyte film.

BACKGROUND ART

A fuel cell is known as a power generation device that has a high power generation efficiency and capable of effectively utilizing thermal energy. As the fuel cell generates power by electrochemical reaction, the power generation efficiency of the fuel cell is higher than those of other power generation systems that take out electric power by secondary means such as, for example, rotating a turbine with steam generated by combustion of fuel. In principle, the fuel cell gives water as a reaction product and does not require combustion of fuel so that there arise low emissions of carbon dioxides and no emissions of nitrogen oxide and sulfur oxide as causes of atmospheric pollution. For this reason, attention has been focused on the fuel cell as a next-generation clean energy source. A polymer electrolyte fuel cell (hereinafter abbreviated as "PEFC") uses a polymer ion exchange film as an electrolyte. Among the PEFC, a direct methanol fuel cell (hereinafter abbreviated as "DMFC") uses methanol in place of hydrogen and generates power by direct reaction of methanol at an electrode thereof. Differently from other fuel cells that dissociate hydrogen into hydrogen ions (protons) and electrons by elimination of the electrons from the hydrogen on the anode side (fuel electrode) under the action of catalysts, the DMFC forms protons, electrons and carbon oxide by direct reaction of methanol with water on the anode electrode under the action of a catalyst. Further, the DMFC can attain a high output density, low temperature operability and size/weight reduction and thus be suitably applied as power sources of a mobile phone, a notebook-size personal computer and the like.

One problem of the DMFC is a crossover phenomenon in which a part of the methanol permeates through the solid electrolyte film from the anode side (fuel electrode) to the cathode side (air electrode). This methanol crossover phenomenon causes not only a fuel loss but also an output deterioration due to consumption of oxygen at the air electrode. The development of a methanol-impermeable solid electrolyte film is a principle issue for performance improvements of the DMFC.

Some types of solid electrolyte films are currently used, one of which is a perfluorocarbonsulfonic acid polymer electrolyte film. This type of electrolyte film is produced or commercially available under the trade name "Nafion" from Du Pont Co., Ltd., "Flemion" from Asahi Glass Co., Ltd., "Aciplex" from Asahi-Kasei Co., Ltd. or "Gore-Select" from Japan Gore-Tex Inc.

In a perfluorocarbonsulfonic acid polymer, a sulfonic acid group has an affinity for water such that water molecules are absorbed onto the sulfonic acid group to form a cluster structure in which the water molecules are clustered together like a bunch of grapes around the sulfonic acid group. It is assumed that the perfluorocarbonsulfonic acid polymer exhibits proton conductivity by migration of protons together with the water molecules in the cluster structure. The rate of permeation of methanol through the perfluorocarbonsulfonic acid polymer is high because methanol is easy to diffuse in the polymer through the clusters. This results in a performance deterioration of the fuel cell using the solid electrolyte film of perfluorocarbonsulfonic acid polymer.

Patent Documents 1 and 2 disclose techniques for prevention of such a methanol crossover phenomenon. In the technique of Patent Document 1, for example, the solid electrolyte film of perfluorocarbonsulfonic acid polymer is irradiated with radiation rays so as to increase the cross-linking degree of the polymer. However, the proton conductivity of the solid electrolyte film decreases with increase in the cross-linking degree of the polymer. The solid electrolyte film also increases in cost due to more complicated production process.

The development of a low-cost solid electrolyte film as an alternative to the perfluorocarbonsulfonic acid polymer electrolyte film is being pursued. For example, Patent Document 2 discloses that a pore-filling membrane in which a porous engineering plastic film is filled with a sulfonic acid group-containing resin shows a reduction in methanol permeability. This membrane however has much lower proton conductivity than that of the perfluorocarbonsulfonic acid polymer electrolyte film. Further, it is necessary to fill the high-acidity resin into the film without no gap left therein. It is also necessary to introduce a cross-linking structure to the filling resin. If the cross-linking of the filling resin is not sufficient, there occurs elution of the resin due to use of high-concentration methanol. Furthermore, the production process of the pore-filling membrane is not common and is not suitable for mass production. For example, in the case of producing a membrane-electrode assembly (hereinafter abbreviated as "MEA") on which a methanol oxidation electrode catalyst is supported, the engineering plastic film has poor adhesion to a binder resin of the catalyst layer during hot pressing and becomes separated because of its high glass transition temperature of 200° C. or higher.

PRIOR ART DOCUMENTS

Patent Documents

Patent Document 1: Japanese Laid-Open Patent Publication No. 2006-179301
Patent Document 2: Japanese Laid-Open Patent Publication No. 2008-112712

SUMMARY OF THE INVENTION

Problems to be Solved by the Invention

As mentioned above, the solid electrolyte film for DMFC needs to have not only high proton conductivity but also low methanol permeability for prevention of methanol crossover and needs to be easy to produce and suitable for mass production. However, there is no solid electrolyte film that satisfies all of these requirements.

It is therefore an object of the present invention to provide a solid electrolyte film that combines high proton conductivity for use in a PEFC, notably a DMFC, with low methanol permeability for prevention of methanol crossover. It is also an object of the present invention to provide a production method suitable for industrially easy mass production of the solid electrolyte film.

Means for Solving the Problems

The conventional solid electrolyte film has a sulfonic acid group introduced as a high-acidity group. The methanol permeability of such a sulfonic acid-containing resin film is high. This is because the diffusion of methanol in the film is promoted as water is strongly held in the film due to high water affinity of the sulfonic acid group. The conventional perfluoro resin electrolyte film has a cluster structure formed with methanol-permeable pores.

On the other hand, it is necessary to permit the presence of water in the solid electrolyte film as a proton carrier in order for the solid electrolyte film to exhibit proton conductivity.

Under the above circumstances, the present inventors have come up with the idea that it is effective to introduce a hydrophobic, highly-acidic group in place of a sulfonic acid group into a resin so as to lower the methanol permeability of the resin and focused and made extensive researches on a resin having a repeating unit formed with a hydrophobic, highly-acidic bis(perfluoroalkanesulfonyl)methide moiety containing two strong electrophilic trifluoromethanesulfonyl groups $SO_2CF_3$ (hereinafter abbreviated as "Tf"). As a result, it has been found that it is possible to provide a resin with high proton conductivity and low methanol permeability by introduction of a polyether structure that coordinates with water by van der Waals force into a hydrophobic, highly-acidic bis (perfluoroalkanesulfonyl)methide-containing repeating unit of the resin. The present invention is based on such a finding.

Namely, there is provided according to the present invention a solid electrolyte film comprising a resin having a repeating unit of the following general formula (1) containing a bis(perfluoroalkanesulfonyl)methide moiety:

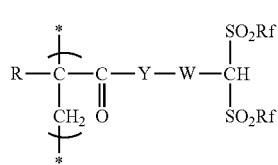

(1)

where R represents a hydrogen atom or a methyl group; Y represents an oxygen atom or NH; Rf represents a $C_1$-$C_4$ perfluoroalkyl group; and W represents either a $C_2$-$C_4$ straight or $C_3$-$C_4$ branched alkylene group or a $C_5$-$C_8$ cyclic hydrocarbon group as a linking group, which may have a branched chain or a cross-linking structure.

In the solid electrolyte film of the present invention, the resin having the repeating unit of the general formula (1) is preferably a polymerization product of a polymerizable compound of the following general formula (2) containing a bis (perfluoroalkanesulfonyl)methide moiety:

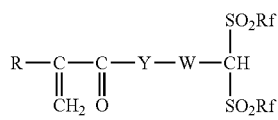

(2)

where R represents a hydrogen atom or a methyl group; Y represents an oxygen atom or NH; Rf represents a $C_1$-$C_4$ perfluoroalkyl group; and W represents either a $C_2$-$C_4$ straight or $C_3$-$C_4$ branched alkylene group or a $C_5$-$C_8$ cyclic hydrocarbon group as a linking group, which may have a branched chain or a cross-linking structure.

If the carbon number exceeds the above-mentioned range in the repeating unit of the general formula (1) or the polymerizable compound of the general formula (2), there arises a problem that it is difficult to synthesize the resin for the solid electrolyte film or difficult to dissolve the compound in a solvent during the synthesis reaction. If the carbon number is smaller than the above-mentioned range, the resulting resin does not have durability sufficient for use in the solid electrolyte film.

The polymerizable compound of the general formula (2) is preferably a polymerizable bis(perfluoroalkanesulfonyl)methide-containing compound (MA-ABMD, W=C3) of the following general formula (3). The MA-ABMD is easy to produce.

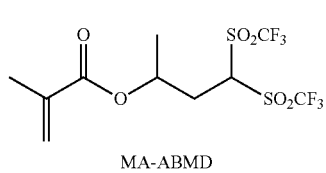

(3)

MA-ABMD

Further, the resin having the repeating unit of the general formula (1) is preferably a resin obtained by polymerization of the polymerizable compound of the general formula (2) with a cross-linkable compound. In the present invention, the cross-linkable compound refers to a compound having at least two or more polymerizable groups (functional groups) in the molecule. The cross-linkable compound is preferably a compound of the general formula (4).

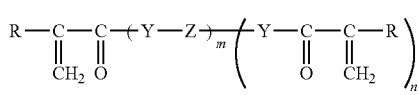

(4)

In the general formula (4), R each independently represents a hydrogen atom or a methyl group; Y each independently represents an oxygen atom or NH; Z represents a $C_1$-$C_4$ straight or $C_3$-$C_4$ branched alkylene group which may have an ether bond, an ester bond, an amide bond or an alkoxy group; m represents an integer of 1 to 30; and n represents an integer of 1 to 5.

In the solid electrolyte film of the present invention, the repeating unit of the general formula (1) is contained in an amount of 6 to 84 mass % based on the total mass of the solid electrolyte film.

If the amount of the bis(perfluoroalkanesulfonyl)methide-containing repeating unit is less than 6 mass %, the effect of significantly reducing the methanol permeability while securing the high proton conductivity may not be expected. If the amount of the bis(perfluoroalkanesulfonyl)methide-containing repeating unit exceeds 84 mass %, the resulting solid electrolyte film may be low in durability.

There is also provided according to the present invention a method for producing the solid electrolyte film, comprising forming a resin of the general formula (1) containing a bis (perfluoroalkanesulfonyl)methide moiety by polymerization of a polymerizable bis(perfluoroalkanesulfonyl)methide-containing compound and a cross-linkable compound.

Further, there are provided according to the present invention a MEA for a fuel cell comprising the above-mentioned solid electrolyte film, a PEFC comprising the above-mentioned solid electrolyte film and a DMFC comprising the above-mentioned solid electrolyte film.

DETAILED DESCRIPTION OF THE EMBODIMENTS

Hereinafter, the present invention will be described below in detail.

A solid electrolyte film according to the present invention includes a resin having a repeating unit of the general formula (1) containing a bis(perfluoroalkanesulfonyl)methide moiety.

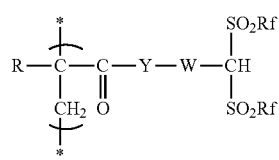
(1)

In the general formula (1), R represents a hydrogen atom or a methyl group; Y represents an oxygen atom or NH; Rf represents a $C_1$-$C_4$ perfluoroalkyl group; and W represents either a $C_2$-$C_4$ straight or $C_3$-$C_4$ branched alkylene group or a $C_5$-$C_8$ cyclic hydrocarbon group as a linking group, which may have a branched chain or a cross-linking structure.

The resin having the repeating unit of the general formula (1) is preferably a polymerization product of a polymerizable compound of the general formula (2) containing a bis(perfluoroalkanesulfonyl)methide moiety.

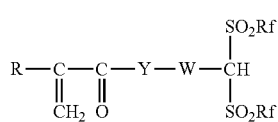
(2)

In the general formula (2), R represents a hydrogen atom or a methyl group; Y represents an oxygen atom or NH; Rf represents a $C_1$-$C_4$ perfluoroalkyl group; and W represents either a $C_2$-$C_4$ straight or $C_3$-$C_4$ branched alkylene group or a $C_5$-$C_8$ cyclic hydrocarbon group, which may have a branched chain or a cross-linking structure.

For example, the resin having the repeating unit of the general formula (1) can be formed by reaction of the polymerizable compound of the general formula (2) with a cross-linkable compound.

The following are specific examples of the polymerizable compound of the general formula (2).

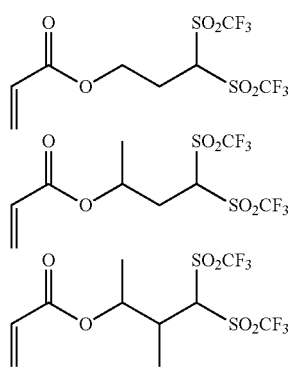

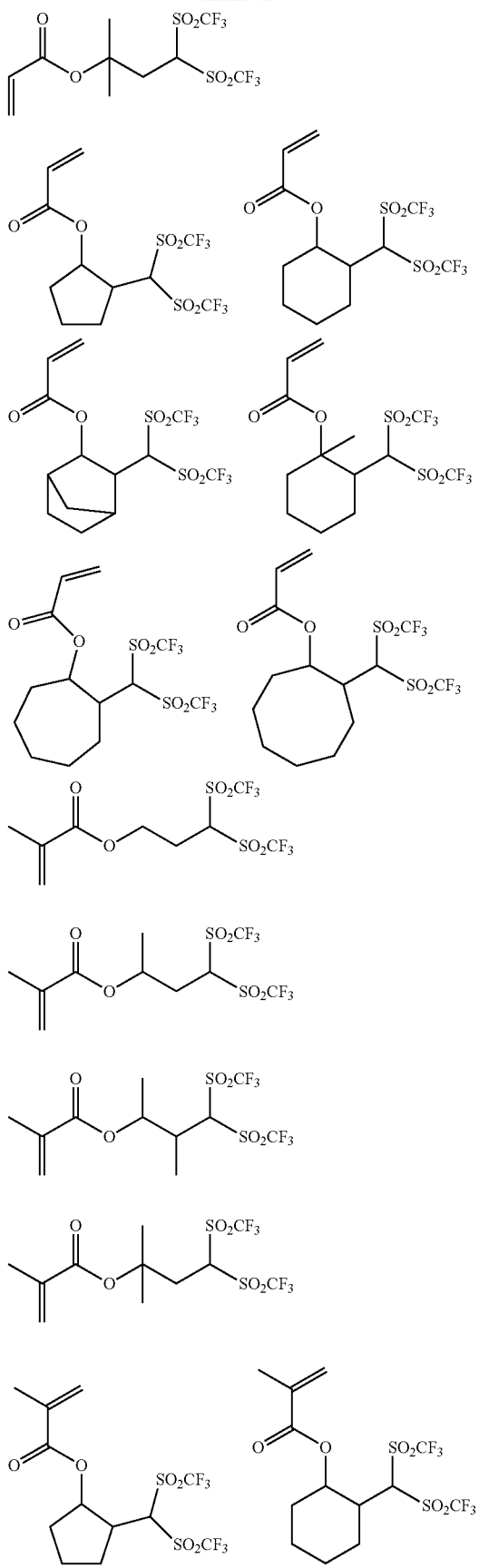

-continued

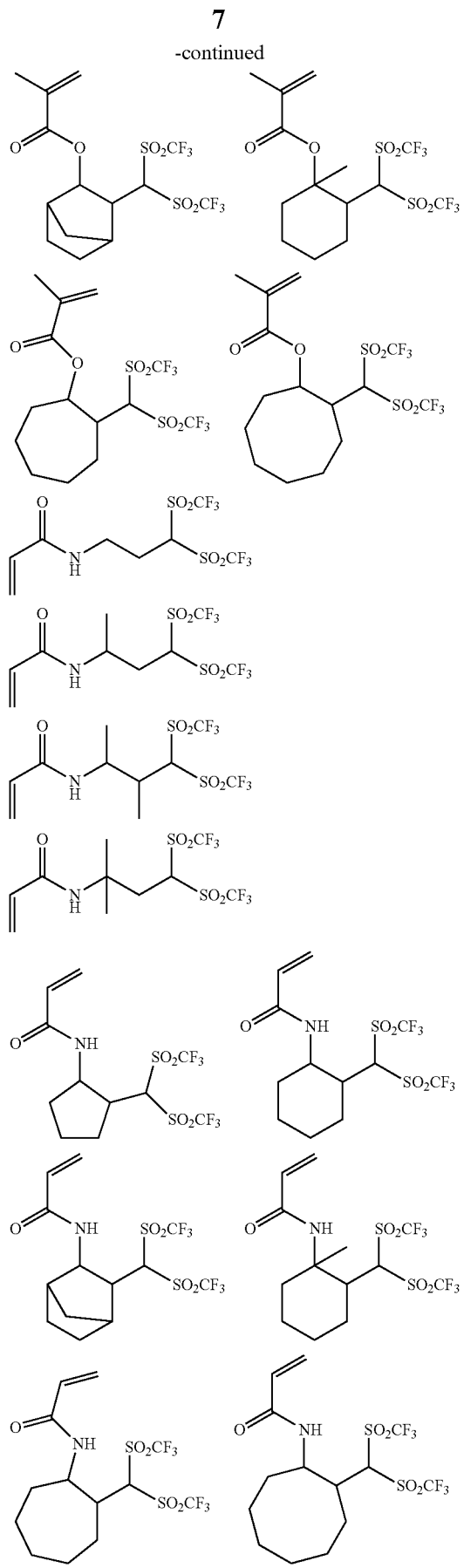

-continued

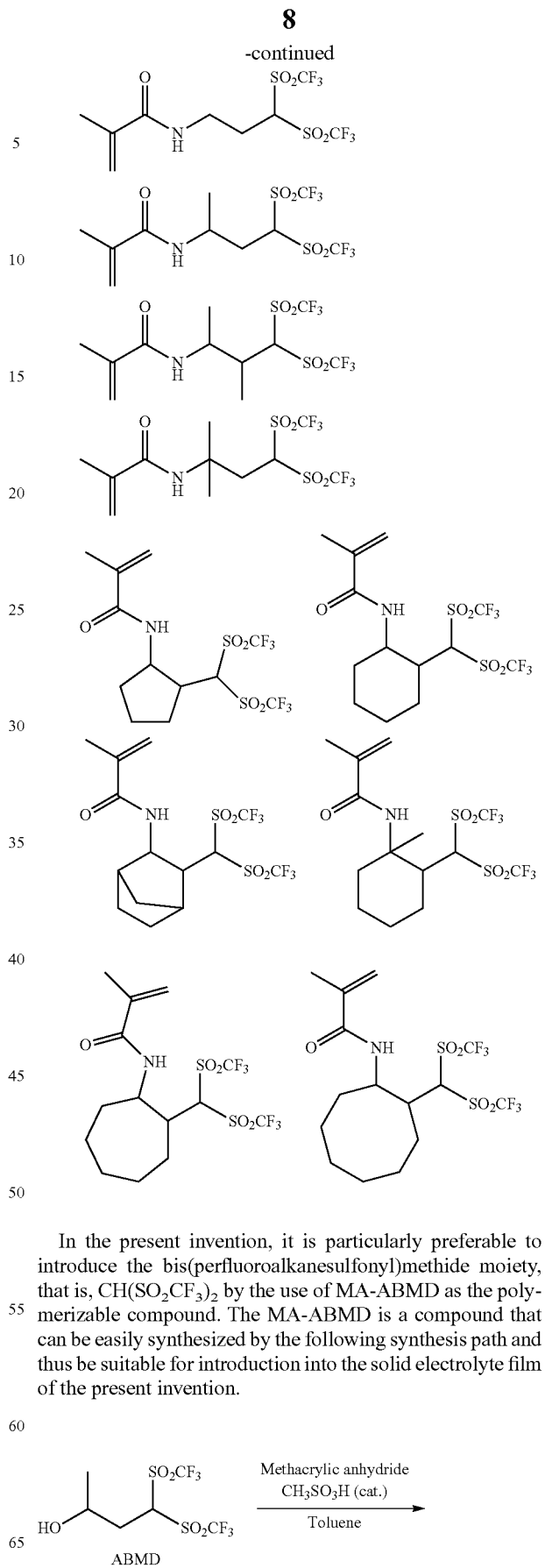

In the present invention, it is particularly preferable to introduce the bis(perfluoroalkanesulfonyl)methide moiety, that is, $CH(SO_2CF_3)_2$ by the use of MA-ABMD as the polymerizable compound. The MA-ABMD is a compound that can be easily synthesized by the following synthesis path and thus be suitable for introduction into the solid electrolyte film of the present invention.

-continued

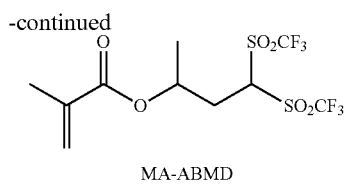

MA-ABMD

The cross-linkable compound polymerizable with the polymerizable compound of the general formula (2) is a compound having at least two or more polymerizable groups (functional groups) in the molecule. Specific examples of the cross-linkable compound are polyethylene glycol diacrylates indicated below and commercially available urethane acrylates (under the trade names of e.g. UA-122P, UA-4HA, UA-6HA, UA-6LPA, UA-1100H, UA-53H, UA-4200, UA-200PA, UA-33H, UA-7100 and UA-7200 from Shin-Nakamura Chemical Co., Ltd.). These compounds can be used alone or in combination of two or more thereof in the present invention.

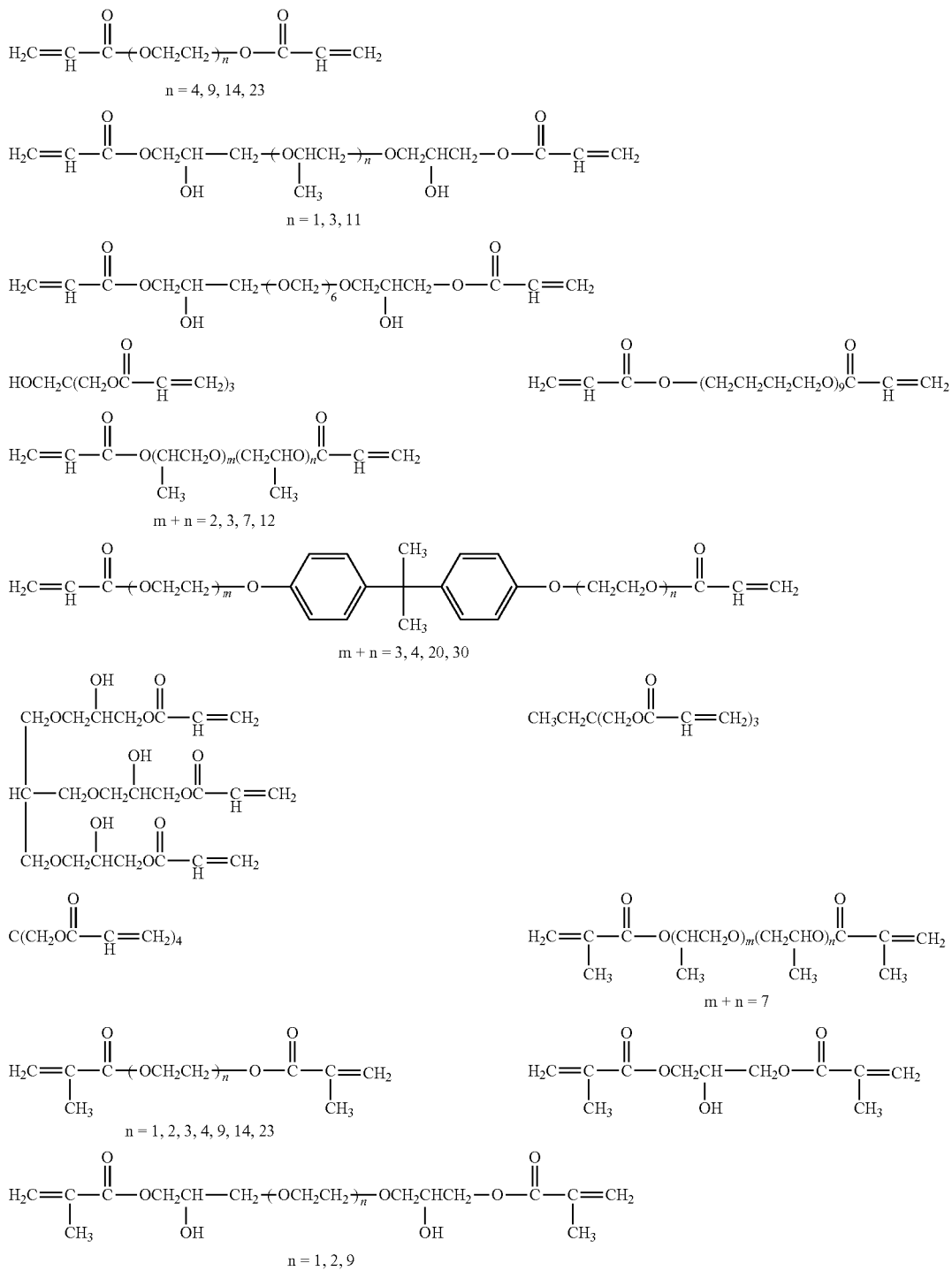

-continued

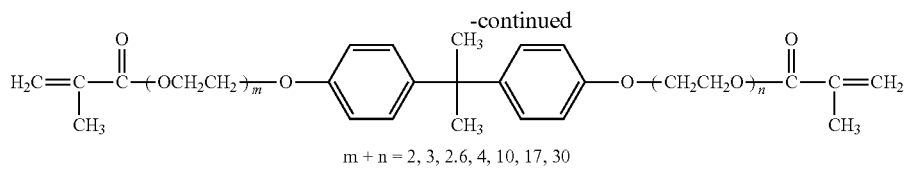

m + n = 2, 3, 2.6, 4, 10, 17, 30

Among others, it is preferable to use a cross-linkable compound of the general formula (4) which is readily available and has good reactivity.

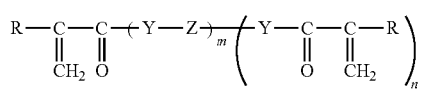

(4)

In the general formula (4), R each independently represents a hydrogen atom or a methyl group; Y each independently represents an oxygen atom or NH; Z represents a $C_1$-$C_4$ straight or $C_3$-$C_4$ branched alkylene group which may have an ether bond, an ester bond, an amide bond or an alkoxy group; m represents an integer of 1 to 30; and n represents an integer of 1 to 5.

There can also suitably be used polyethylene glycol diacrylate in view of good availability and good reactivity. The polyethylene glycol diacrylate is commercially available under the trade name of e.g. A-200 from Shin-Nakamura Chemical Co., Ltd.

One typical example of the resin having the repeating unit of the general formula (1), which is the constituent component of the solid electrolyte film of the present invention, is a resin of the general formula (5).

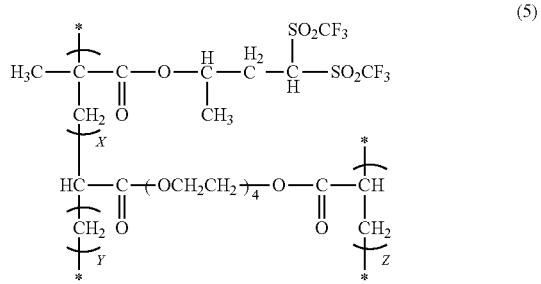

(5)

In the general formula (5), X, Y and X each represent a positive integer indicating a degree of polymerization.

The polymerizable compound of the general formula (2) can favorably be polymerized with the cross-linkable compound by radical polymerization process with the use of a radical polymerization initiator. Alternatively, there can be adopted ion polymerization process, coordinate anionic polymerization process, living anionic polymerization process, cationic polymerization process, ring-opening metathesis polymerization process, transition metal catalyst polymerization process, vinylene polymerization process, vinyl addition process, thermal polymerization process or radiation-induced polymerization.

The radical polymerization process can be performed by a known polymerization technique such as bulk polymerization, solution polymerization, suspension polymerization or emulsion polymerization in a batch, semi-continuous or continuous system in the presence of the radical polymerization initiator or radical initiating source.

As the radical polymerization initiator, there can be used any of azo compounds, peroxide compounds and redox compounds. Preferred examples of the radical polymerization initiator are azobisbutyronitrile, tert-butylperoxypivalate, di-tert-butyl peroxide, i-butyryl peroxide, lauroyl peroxide, succinic peroxide, dicinnamyl peroxide, di-n-propylperoxydicarbonate, tert-butylperoxyallyl monocarbonate, benzoyl peroxide, hydrogen peroxide and ammonium persulfate. In view of good availability and good reactivity, it is preferable to use tert-butylperoxypivalate as the radical polymerization initiator for preparation of the resin for the solid electrolyte film of the present invention.

A solvent may be or may not be used in the polymerization reaction for preparation of the resin for the solid electrolyte film of the present invention. Any solvent applicable for ordinary radical polymerization process can suitably be used. Examples of the solvents are ester solvents such as ethyl acetate and n-butyl acetate, ketone solvents such as acetone and methyl isobutyl ketone, hydrocarbon solvents such as toluene and cyclohexane, and alcohol solvents such as methanol, isopropyl alcohol and ethylene glycol monomethyl ether. There can also be used water, ether solvents, cyclic ether solvents, fluorocarbon solvents and aromatic solvents. These solvents can be used solely or in combination of two or more thereof as the polymerization solvent.

The reaction temperature of the polymerization reaction is generally preferably in the range of 50 to 150° C., more preferably 80 to 120° C. in view of handling. It is feasible to produce the colorless transparent solid electrolyte film by applying a raw material solution containing the polymerizable compound and the cross-linkable compound onto a glass substrate by means of a bar coater etc., and then, subjecting the raw material solution to radical polymerization. The thus-obtained solid electrolyte film may be immersed in an aqueous solution of hydrochloric acid or sulfuric acid and washed with ion exchange water as needed.

Further, the mechanical strength of the solid electrolyte film can be increased by impregnating a porous film with the raw material solution containing the polymerizable compound and the cross-linkable compound or by mixing nano silica fine particles, glass fibers or the like into the raw material solution. Although there is no particular limitation on the thickness of the solid electrolyte film, the solid electrolyte film is preferably in the range of 10 to 200 µm. It is difficult to handle the solid electrolyte film if the thickness of the solid electrolyte film is smaller than 10 µm. If the thickness of the solid electrolyte film exceeds 200 µm, the resistance of the solid electrolyte film becomes so large that the properties of the solid electrolyte film as an electrochemical device tends to be deteriorated. The thickness of the solid electrolyte film is adjusted by controlling the thickness of application on the substrate, i.e., the amount of application per unit volume.

EXAMPLES

The solid polymer film of the present invention will be described in more detail below by way of the following examples. It should be noted that the following examples are intended to only illustrate embodiments of the solid electrolyte film and its production method of the present invention and are not intended to limit the polymer electrolyte film of the present invention thereto.

Monomer Synthesis Example 1

In a 100-ml three-neck flask with a reflux condenser, 10 g (0.030 mol) of 3-hydroxy-1,1-bis(trifluoromethanesulfonyl) butyric acid (hereinafter abbreviated as "ABMD"), 35 g of toluene, 0.29 g (0.003 mol) of methanesulfonic acid, 0.05 g (0.5 parts by mass relative to the ABMD) of 2,2-methylene-bis(4-methyl-6-tert-butylphenol) (available under the trade name of Nonflex MBP from Seiko Chemical Co., Ltd.) were placed under a nitrogen atmosphere. The three-neck flask was cooled down to 7° C. Then, 4.85 g (0.032 mol) of methacrylic anhydride (hereinafter abbreviated as "MAAH") was gradually dropped little by little into the three-neck flask over 10 minutes. After the completion of the dropping, the three-neck flask was heated and held at 70° C. In this state, the content of the flask was kept stirred for 3.5 hours. The three-neck flask was subsequently cooled down to a room temperature (about 20° C.). The content of the flask was washed twice by adding 30 g of toluene and 35 g of pure water to the flask content and stirring the flask content. After the washing operation, the content of the flask was dehydrated by azeotropic distillation with toluene and mixed with 0.123 g of Nonflex MBP. The resulting mixture was subjected to reduced-pressure distillation at 83 to 86° C. under a reduced pressure of 70 Pa, thereby distilling and yielding 9.29 g of 3-methacryloxy-1,1-bis(trifluoromethanesulfonyl)butyric acid (hereinafter abbreviated as "MA-ABMD"). The yield of the MA-ABMD was 77.2%. In this way, the MA-ABMD was obtained by reaction of the ABMD with the methanesulfonic acid and MAAH. The reaction scheme was as indicated below. [Properties of MA-ABMD] $^1$H-NMR (solvent: deuterated chloroform); δ=6.13 (s, 1H), 5.66 (s, 1H), 5.58 (m, 1H), 5.22 (dd, 1H), 2.71 (m, 2H), 1.94 (s, 3H), 1.42 (d, 3H).

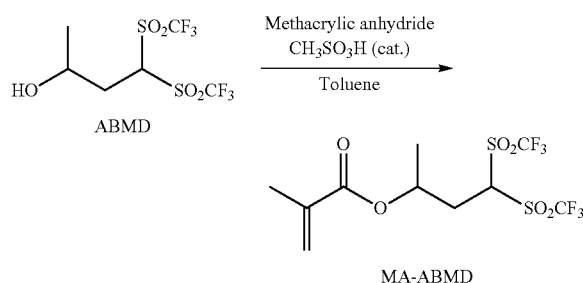

Using the MA-ABMD obtained in the Monomer Synthesis Example 1, resins were produced as materials for solid electrolyte films of polymer electrolyte fuel cells. The detailed production procedures were as indicated below in Examples 1 to 6.

Example 1

In a glass flask, 4.06 g (0.0100 mol) of the MA-ABMD, 0.76 g (0.0025 mol) of polyethylene glycol diacrylate (available under the trade name of A-200 from Shin-Nakamura Chemical Co., Ltd.) and 0.10 g of tert-butylperoxypivalate (available under the trade name of Perbutyl PV from NOF Corporation) as a polymerization initiator were placed. The resulting mixed solution was degassed with sufficient stirring. Nitrogen gas was then introduced into the mixed solution. On the other hand, there was provided a pair of glass plates with a spacer having a particle size of 60 μm interposed therebetween. The above-prepared mixed solution was filled by capillarity action into a gap into between the glass plates and held for 30 minutes in an oven heated at 80° C. The temperature of the oven was raised at a rate of 1° C./min. The filled solution was further held at 120° C. for 60 minutes and thereby hardened to a film. The film was cooled down to a room temperature, and then, immersed in water. With this, the solid electrolyte film of 0.05 mm in thickness and 60 mm×60 mm in sizes, containing a resin of the general formula (5), was obtained.

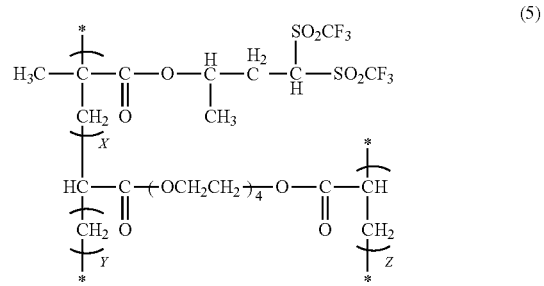

In the general formula (5), X, Y and Z each represent a positive integer indicating a degree of polymerization.

Example 2

In a glass flask, 2.54 g (0.0063 mol) of the MA-ABMD, 1.89 g (0.0063 mol) of polyethylene glycol diacrylate (available under the trade name of A-200 from Shin-Nakamura Chemical Co., Ltd.) and 0.10 g of tert-butylperoxypivalate (available under the trade name of Perbutyl PV from NOF Corporation) as a polymerization initiator were placed. The resulting mixed solution was degassed with sufficient stirring. Nitrogen gas was then introduced into the mixed solution. The above-prepared solution was hardened in the same manner as in Example 1, thereby obtaining a solid electrolyte film.

Example 3

In a glass flask, 1.51 g (0.0037 mol) of the MA-ABMD, 2.64 g (0.0088 mol) of polyethylene glycol diacrylate (available under the trade name of A-200 from Shin-Nakamura Chemical Co., Ltd.) and 0.10 g of tert-butylperoxypivalate (available under the trade name of Perbutyl PV from NOF Corporation) as a polymerization initiator were placed. The resulting mixed solution was degassed with sufficient stirring. Nitrogen gas was then introduced into the mixed solution. The above-prepared solution was hardened in the same manner as in Example 1, thereby obtaining a solid electrolyte film.

Example 4

In a glass flask, 1.02 g (0.0025 mol) of the MA-ABMD, 3.02 g (0.0100 mol) of polyethylene glycol diacrylate (available under the trade name of A-200 from Shin-Nakamura Chemical Co., Ltd.) and 0.10 g of tert-butylperoxypivalate (available under the trade name of Perbutyl PV from NOF Corporation) as a polymerization initiator were placed. The resulting mixed solution was degassed with sufficient stirring. Nitrogen gas was then introduced into the mixed solution.

The above-prepared solution was hardened in the same manner as in Example 1, thereby obtaining a solid electrolyte film.

Example 5

In a glass flask, 0.51 g (0.0013 mol) of the MA-ABMD, 3.40 g (0.0113 mol) of polyethylene glycol diacrylate (available under the trade name of A-200 from Shin-Nakamura Chemical Co., Ltd.) and 0.10 g of tert-butylperoxypivalate (available under the trade name of Perbutyl PV from NOF Corporation) as a polymerization initiator were placed. The resulting mixed solution was degassed with sufficient stirring. Nitrogen gas was then introduced into the mixed solution. The above-prepared solution was hardened in the same manner as in Example 1, thereby obtaining a solid electrolyte film.

Example 6

In a glass flask, 0.25 g (0.0006 mol) of the MA-ABMD, 3.59 g (0.0119 mol) of polyethylene glycol diacrylate (available under the trade name of A-200 from Shin-Nakamura Chemical Co., Ltd.) and 0.10 g of tert-butylperoxypivalate (available under the trade name of Perbutyl PV from NOF Corporation) as a polymerization initiator were placed. The resulting mixed solution was degassed with sufficient stirring. Nitrogen gas was then introduced into the mixed solution. The above-prepared solution was hardened in the same manner as in Example 1, thereby obtaining a solid electrolyte film.

Comparative Example 1

A solid electrolyte film was produced without using the MA-ABMD. More specifically, 3.78 g (0.0125 mol) of polyethylene glycol diacrylate (available under the trade name of A-200 from Shin-Nakamura Chemical Co., Ltd.) and 0.10 g of tert-butylperoxypivalate (available under the trade name of Perbutyl PV from NOF Corporation) as a polymerization initiator were placed in a glass flask. The resulting mixed solution was degassed with sufficient stirring. Nitrogen gas was then introduced into the mixed solution. The above-prepared solution was hardened in the same manner as in Example 1. With this, the solid electrolyte film was obtained.

Comparative Example 2

A solid electrolyte film of perfluorocarbonsulfonic acid polymer commercially available under the trade name of Nafion 112 from Du Pont Co., Ltd. was used.

[Performance Evaluation]

The solid electrolyte films of Examples 1 to 6 according to the present invention and the solid electrolyte film of Comparative Example 1 using no MA-ABMD and the commercially available solid electrolyte film of Comparative Example 2, both of which were out of the technical scope of the present invention, were tested and compared for the proton conductivity and methanol permeability.

(Proton Conductivity)

The proton conductivity was determined by the following procedure. The electrolyte film was adhered to a platinum film electrode. An electrochemical impedance measurement device (model VFP 600 manufactured by Gamry Instruments Inc.) was connected to the electrode. Using this measurement device, the alternating-current resistance of the electrolyte film was determined by alternating-current impedance measurement within the frequency range of 1 Hz to 1 MHz. The specific resistance of the proton-conductive electrolyte film was calculated from the resistance gradient over the inter-electrode distance based on the following formula. The alternating-current impedance of the proton-conductive electrolyte film was calculated from the inverse of the specific resistance. Herein, the film electrode used was that obtained by sputtering platinum onto a substrate film with a sputtering device. The film electrode is advantageous in that it is possible to preciously control the electrode distance and favorably measure the specific resistance without causing deformation of the film by pressing of the electrode. The calculation formulas of the specific resistance and the proton conductivity are indicated below.

Specific resistance $R$ ($\Omega \cdot cm$)=Film width (cm)×Film thickness (cm)×Resistance gradient between lines ($\Omega$/cm)

Proton conductivity $\sigma$ (S/cm)=1/$R$ (Methanol Permeability)

The methanol permeability was determined by the following procedure. The solid electrolyte film was, after being immersed in ion exchange water for 1 day, sandwiched between separable type glass cells available from TechnoSigma Inc. One of the cells was charged with 20 ml of a mixed liquid of 10 mass % or 30 mass % methanol and water, whereas the other cell was charged with 20 ml of ion exchange water. Using a gas chromatograph (model GC2010 manufactured by Shimadzu Corporation), the concentration of methanol in the ion exchange water was measured with stirring at 25° C.

The test results of the proton conductivity and the methanol permeability of the solid electrolyte films of Examples 1 to 6 and Comparative Examples 1 to 2 are indicated in TABLE 1. In TABLE 1, all percentages are by mass.

TABLE 1

| | Content (mmol/g) of bis(perfluoroalkanesulfonyl)methide | Film thickness (mm) | Proton conductivity $\sigma$ | Water content (%) |
|---|---|---|---|---|
| Example 1 | 2.07 | 0.059 | 0.005 | 5.7 |
| Example 2 | 1.43 | 0.051 | 0.032 | 30.6 |
| Example 3 | 0.89 | 0.063 | 0.144 | 50.3 |
| Example 4 | 0.62 | 0.041 | 0.047 | 42.2 |
| Example 5 | 0.33 | 0.039 | 0.010 | 19.2 |
| Example 6 | 0.16 | 0.034 | 0.007 | 19.6 |
| Comparative Example 1 | — | 0.029 | 0.0007 | 6.5 |
| Comparative Example 2 | — | 0.053 | 0.170 | 22.4 |

| | Methanol (MeOH) permeation rate ($10^{-6}$ mol/cm$^2$ · min) | | | |
|---|---|---|---|---|
| | MeOH 10% | MeOH 30% | MeOH 60% | EtOH 10% |
| Example 1 | — | — | — | — |
| Example 2 | — | — | — | — |
| Example 3 | 1.1 | 4.9 | 20.6 | 0.1 |
| Example 4 | — | — | — | — |
| Example 5 | — | — | — | — |
| Example 6 | — | — | — | — |
| Comparative Example 1 | 0.3 | 1.2 | — | — |
| Comparative Example 2 | 33.4 | 104.3 | 280.3 | 1.4 |

As shown in TABLE 1, the solid electrolyte films of Examples 1 to 6 that contained the bis(perfluoroalkanesulfonyl)methide moiety according to the present invention had one or more orders of magnitude higher proton conductivity than that of the solid electrolyte film of Comparative Example 1 that did not contain the bis(perfluoroalkanesulfonyl)methide moiety and did not fall within the scope of the present invention. The proton conductivity of the solid electrolyte film of Example 3 was particularly high and was as high as that of the commercially available solid electrolyte film of Comparative Example 2. Further, the solid electrolyte films of Examples 1 to 6 had one or more orders of magnitude lower methanol (MeOH) permeability than that of the commercially available solid electrolyte film of Comparative Example 2. The solid electrolyte films of Examples 1 to 6 similarly had low ethanol (EtOH) permeability. As seen from the above test results, the solid electrolyte films of Examples 1 to 6 had favorable proton conductivity. In particular, the solid electrolyte film of Example 3 had low methanol permeability and good alcohol barrier properties and thus was suitable for use in DMFC.

As described above, it is possible according to the present invention to significantly reduce the methanol permeability of the solid polymer electrolyte film, while securing the high proton conductivity of the solid polymer electrolyte film, by introduction of a polyether structure, which coordinates with water by van der Waals force, together with a hydrophobic, highly-acidic bis(perfluoroalkanesulfonyl)methide moiety into the chemical structural unit of the film resin. The solid electrolyte film according to the present invention can suitably be applied for a polymer electrolyte fuel cell PFEC, notably DMFC, because of its high proton conductivity and good alcohol barrier properties. Further, the production method of the solid electrolyte film according to the present invention is industrially easily practicable and suitable for mass production.

Although the present invention has been described with reference to the above embodiments, various modifications and variations of the above embodiments can be made based on the knowledge of those skilled in the art without departing from the scope of the present invention. All of the publications cited in the present specification, such as prior art documents and patent documents e.g. published patents and patent applications, are herein incorporated by reference.

The invention claimed is:

1. A method for producing a solid electrolyte film, comprising:

(a) forming a resin having a repeating unit of the general formula (1)

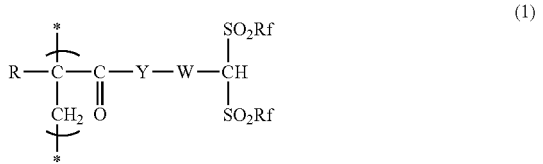

(1)

by polymerization of a polymerizable bis(perfluoroalkanesulfonyl)methide-containing compound of the general formula (2)

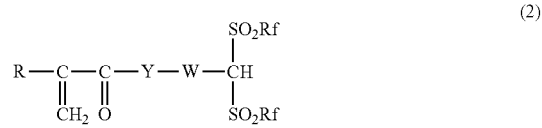

(2)

and a cross-linkable compound of the general formula (4)

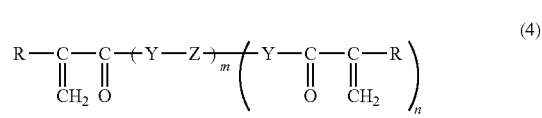

(4)

where R represents a hydrogen atom or a methyl group; Y represents an oxygen atom or NH; Rf represents a $C_1$-$C_4$ perfluoroalkyl group; W represents either a $C_2$-$C_4$ straight or $C_3$-$C_4$ branched alkylene group or a $C_5$-$C_8$ cyclic hydrocarbon group as a linking group, which may have a branched chain or a cross-linking structure; Z represents a $C_1$-$C_4$ straight or $C_3$-$C_4$ branched alkylene group which may have an ether bond, an ester bond, an amide bond or an alkoxy group; m represents an integer of 1 to 30; and n represents an integer of 1 to 5; and (b) producing the solid electrolyte film by hardening a solution containing the resin.

2. The method according to claim 1, where the polymerizable bis(perfluoroalkanesulfonyl)methide-containing compound of the general formula (2) is a polymerizable compound (MA-ABMD) of the general formula (3) containing a bis(perfluoroalkanesulfonyl)methide moiety:

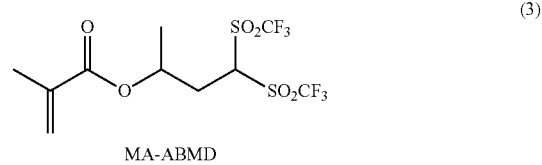

(3)

MA-ABMD

3. The method according to claim 1, wherein the repeating unit of the general formula (1) of the resin is contained in an amount of 6 to 84 mass % based on the total mass of the solid electrolyte film.

* * * * *